United States Patent
Shuman et al.

(10) Patent No.: US 10,685,003 B2
(45) Date of Patent: Jun. 16, 2020

(54) BUILDING AND USING AN ATOMIC KEY WITH PARTIAL KEY SEARCHING CAPABILITY

(71) Applicant: International Business Machines Corporation, Armonk, NY (US)

(72) Inventors: Steven S. Shuman, Monument, CO (US); Claude Warren, Jr., Salthill (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1023 days.

(21) Appl. No.: 15/196,332

(22) Filed: Jun. 29, 2016

(65) Prior Publication Data
US 2018/0004743 A1   Jan. 4, 2018

(51) Int. Cl.
*G06F 16/22* (2019.01)
*G06F 16/9535* (2019.01)

(52) U.S. Cl.
CPC ...... *G06F 16/2255* (2019.01); *G06F 16/2228* (2019.01); *G06F 16/9535* (2019.01)

(58) Field of Classification Search
CPC .. G06F 16/2255; G06F 16/285; G06F 16/245; G06F 16/9014; G06F 16/2228; G06F 16/9535
USPC ................................................ 707/736, 737
See application file for complete search history.

(56) References Cited

U.S. PATENT DOCUMENTS

| | | | |
|---|---|---|---|
| 8,266,506 B2 | 9/2012 | Hao et al. | |
| 8,359,316 B2 | 1/2013 | Franke et al. | |
| 8,666,989 B1 | 3/2014 | Gilliam et al. | |
| 9,372,892 B1 | 1/2016 | Chainani | |
| 9,501,527 B1 | 11/2016 | Chainani et al. | |
| 9,846,697 B2 * | 12/2017 | Goo | G06F 16/113 |
| 9,872,337 B2 | 1/2018 | Ayach et al. | |

(Continued)

FOREIGN PATENT DOCUMENTS

| | | |
|---|---|---|
| CN | 102195866 B | 5/2014 |
| RU | 2012101682 A | 7/2013 |

OTHER PUBLICATIONS

Andrew Lavelle et al., "Constructing and Querying a Bloom Filter to Detect the Absence of Data From One or More Endpoints," U.S. Appl. No. 15/358,223, filed Nov. 22, 2016.

(Continued)

*Primary Examiner* — James Trujillo
*Assistant Examiner* — Fariborz Khoshnoodi
(74) *Attorney, Agent, or Firm* — Cantor Colburn LLP; Alexander Jochym (57) ABSTRACT

A computer-implemented method includes determining a key set of properties. Based on the key set, a plurality of keys are generated for a plurality of objects, where the plurality of keys include a respective key for each object based on a value associated with the object for each property in the key set. A request is received to search for matching objects having a set of desired values for a desired set of properties, where the desired set of properties are a subset of the key set and exclude one or more properties in the key set. A Bloom filter search is performed on the plurality of objects. The Bloom filter search is based on the set of desired values for the desired set of properties and further based on the plurality of keys that are based on the key set. The matching objects are identified from the search.

14 Claims, 5 Drawing Sheets

(56) References Cited

U.S. PATENT DOCUMENTS

| | | | |
|---|---|---|---|
| 2006/0072582 A1 | 4/2006 | Bronnimann | |
| 2010/0146004 A1* | 6/2010 | Sim-Tang | G06F 11/1448 |
| | | | 707/797 |
| 2013/0132408 A1 | 5/2013 | Little | |
| 2013/0138646 A1* | 5/2013 | Sirer | G06F 16/27 |
| | | | 707/736 |
| 2013/0166576 A1 | 6/2013 | Hudzia et al. | |
| 2014/0067830 A1 | 3/2014 | Buhler et al. | |
| 2014/0195720 A1 | 7/2014 | Akella et al. | |
| 2014/0274752 A1 | 9/2014 | Blume et al. | |
| 2014/0280337 A1 | 9/2014 | Vuong et al. | |
| 2014/0280155 A1 | 12/2014 | Elliot | |
| 2015/0032684 A1* | 1/2015 | Gupta | G06F 16/283 |
| | | | 707/600 |
| 2016/0098487 A1 | 4/2016 | Kim et al. | |
| 2016/0154861 A1 | 6/2016 | Hegerty | |
| 2017/0070492 A1 | 3/2017 | Rubin | |
| 2018/0060593 A1 | 3/2018 | Abraham | |

OTHER PUBLICATIONS

List of IBM Patents or Patent Applications Treated as Related; (Appendix P), Filed Apr. 19, 2018; 2 pages.

Apaydin et al, "Approximate Encoding for Direct Access and Query Processing over Compressed Bitmaps," Proceeding VLDB '06 Proceedings of the 32nd international conference on Very large data bases pp. 846-857.

Andrew Lavelle et al., "Constructing and Querying a Bloom Filter to Detect the Absence of Data From One or More Endpointsy", U.S. Appl. No. 15/358,223, filed Nov. 2016.

List of IBM Patents or Patent Applications Treated as Related; (Appendix P), Filed Feb. 13, 2017); 2 pages.

* cited by examiner

BUILDING AND USING AN ATOMIC KEY WITH PARTIAL KEY SEARCHING CAPABILITY

BACKGROUND

Embodiments of the present invention relate to key searches and, more specifically, to building and using an atomic key with partial key searching capability.

A data repository, such as a database, may maintain numerous data objects. A user or application may wish to search those data objects efficiently. Conventionally, the data objects may be indexed based on a property acting as a primary key, or based on a combination of properties. The exact value indexed would need to be used when searching. Thus, when an index is based on a combination of properties, all of the properties in that combination would need to be used to effectively search the data repository for matching objects. As a result, many such data repositories store multiple indexes for each object, where each index represents some combination of properties, to enable efficient searching across the indexes.

SUMMARY

According to an embodiment of this disclosure, a computer-implemented method includes determining a key set of properties, where the key set of properties are a subset of a plurality of available properties. Based on the key set of properties, a plurality of keys are generated for a plurality of objects, where the plurality of keys include a respective key for each object based on a value associated with the object for each property in the key set of properties. A request is received to search for one or more matching objects having a set of desired values for a desired set of properties, where the desired set of properties are a subset of the key set of properties and exclude one or more properties in the key set of properties. A Bloom filter search is performed, by a computer processor, on the plurality of objects. The Bloom filter search is based on the set of desired values for the desired set of properties and further based on the plurality of keys for the plurality of objects that are based on the key set of properties. The one or more matching objects are identified based on the Bloom filter search.

In another embodiment, a system includes a memory having computer readable instructions and one or more processors for executing the computer readable instructions. The computer readable instructions include determining a key set of properties, where the key set of properties are a subset of a plurality of available properties. Further according to the computer readable instructions, and based on the key set of properties, a plurality of keys are generated for a plurality of objects. The plurality of keys include a respective key for each object based a value associated with the object for each property in the key set of properties. A request is received to search for one or more matching objects having a set of desired values for a desired set of properties, where the desired set of properties are a subset of the key set of properties and exclude one or more properties in the key set of properties. A Bloom filter search is performed on the plurality of objects. The Bloom filter search is based on the set of desired values for the desired set of properties and further based on the plurality of keys for the plurality of objects that are based on the key set of properties. The one or more matching objects are identified based on the Bloom filter search.

In yet another embodiment, a computer program product for searching among objects includes a computer readable storage medium having program instructions embodied therewith. The program instructions are executable by a processor to cause the processor to perform a method. The method includes determining a key set of properties, where the key set of properties are a subset of a plurality of available properties. Further according to the method, and based on the key set of properties, a plurality of keys are generated for a plurality of objects. The plurality of keys include a respective key for each object based a value associated with the object for each property in the key set of properties. A request is received to search for one or more matching objects having a set of desired values for a desired set of properties, where the desired set of properties are a subset of the key set of properties and exclude one or more properties in the key set of properties. A Bloom filter search is performed on the plurality of objects. The Bloom filter search is based on the set of desired values for the desired set of properties and further based on the plurality of keys for the plurality of objects that are based on the key set of properties. The one or more matching objects are identified based on the Bloom filter search.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Various embodiments of this disclosure are search systems that create a key for each object stored in a data repository, where each key may be based on the values of one or more properties, or fields, of the respective object. Despite potentially being based on multiple properties, each key may be atomic (i.e., not multi-segmented) and may be searchable based on a subset of the one or more properties on which the keys are based.

Figure 1:
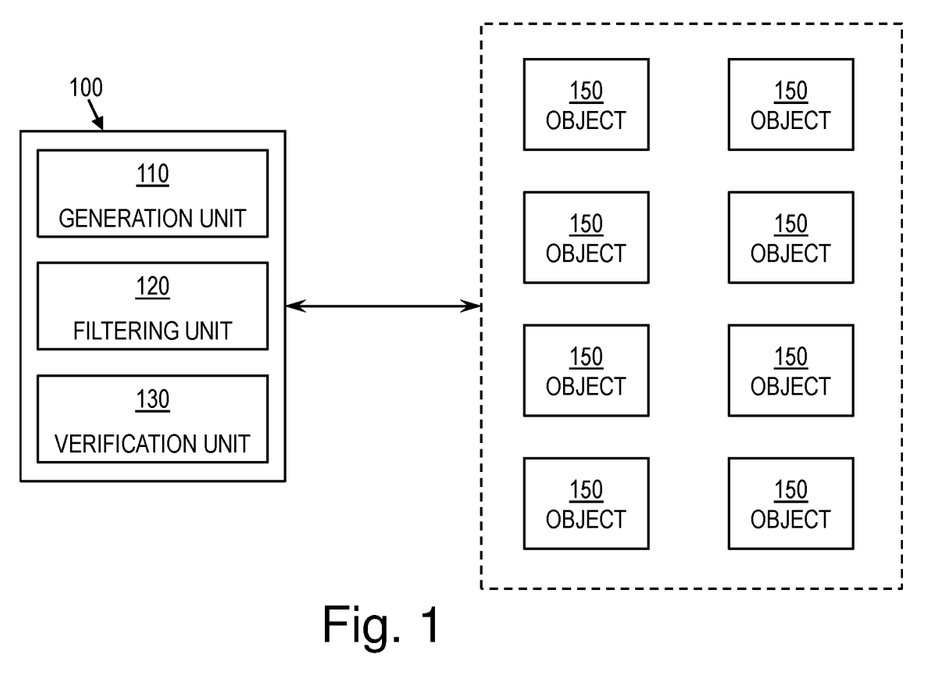
FIG. 1 is a block diagram of a search system 100, according to some embodiments of this disclosure.

FIG. 1 is a block diagram of a search system 100, according to some embodiments of this disclosure. As shown, the search system 100 may include a generation unit 110, a filtering unit 120, and a verification unit 130, each of which may operate on a set of objects 150. Each object 150 may be a set of data including a value corresponding to each property (e.g., a field in a database table) among a set of available properties. A subset of the available properties may be established as a key set of properties, where the values of the properties in the key set may be incorporated into the respective key associated with an object 150. In some embodiments, the key set may be a proper subset, such that not all of the available properties are incorporated into each key, or may be an improper subset incorporating all available properties.

Generally, the generation unit 110 may generate a key for each object 150, where the key is based on the object's values in the key set of properties; when objects 150 are sought having matching values in at least one property of the key set, the filtering unit 120 may generate a candidate key based on those values, and may identify potential matches based on the candidate key; and the verification unit 130 may verify those potential matches to identify matches. The generation unit 110, the filtering unit 120, and the verification unit 130 may each include hardware, software, or a combination of both. Further, although these components are illustrated in FIG. 1 as being distinct, they may share hardware, software, or both, or they may be further divided based on desired design of the search system 100.

In some embodiments, an object's key may be stored in association with that object, such as being stored as part of the object 150 itself or being stored in table that maintains such associations between objects 150 and their respective keys. In some embodiments, the space required to store a key may be smaller than the space required to store the properties in the key set, and may be smaller than the space required to store an index based on those properties. Thus, the search system 100 may provide an improvement over conventional indexing.

According to some embodiments, the use of keys described herein may allow users or applications to search for objects 150 having various combinations of values in the properties making up the key set. These various combinations may include a value for each property in the key set, or may include values for only a proper subset of the properties in the key set. In other words, the search system 100 may enable searching across the full key set of properties, considering the entirety of each key, while the search system 100 may also enable searching across a proper subset of the key set, considering only a partial key for each object. Conventionally, while a Bloom filter may incorporate multiple properties, partial key consideration is unsupported, and any searching must therefore involve all of the properties incorporated into a key.

Figure 2:
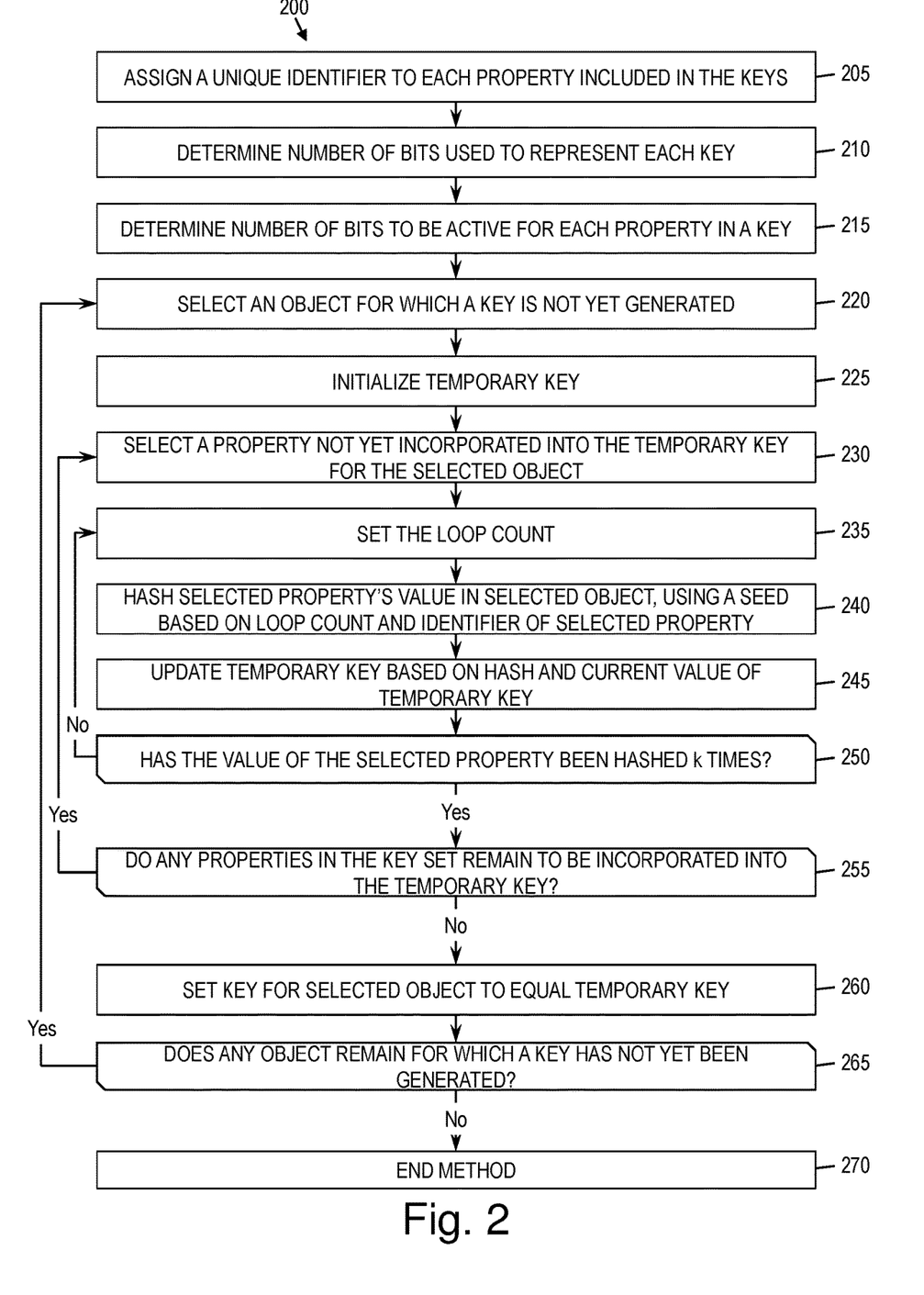
FIG. 2 is a flow diagram of a method for generating keys for objects, according to some embodiments of this disclosure.

FIG. 2 is a flow diagram of a method for generating keys associated with objects 150, according to some embodiments of this disclosure.

As shown, at block 205, the search system 100 may assign a unique identifier to each property to be included in the keys, where together the properties included in the keys are defined as the key set of properties. In some embodiments, the unique identifiers may be numerical. For example, and not by way of limitation, each property in the key set may be selected one at a time, starting with a first property. The first property may be assigned an identifier equal to a base value, such as 0 or 1, and each subsequent property selected may be assigned an identifier incremented by a value, such as 1, over the identifier assigned to the prior selected property.

At block 210, the search system 100 may determine how many bits, m, will be used to represent a key. Various techniques known in the art of Bloom filters may be used to determine the number of bits used. At block 215, the search system 100 may determine how many bits, k, will be turned on, or active, for each property. Again, various techniques in the art of Bloom filters may be used to determine the number of bits used for k.

The search system 100 may iterate over the various objects 150, generating a key for each object in turn. To this end, at block 220, an object may be selected for key generation. In turn, each object may be selected and its respective key generated within an iterative loop as described below. At block 225, the value of a variable representing a temporary key for the selected object may be initialized, such as to a value of 0, in preparation for determining the key.

As mentioned above an object's key may include one or more properties. For the selected object, the search system 100 may iterate over these one or more properties included in the key. To this end, at block 230, for the selected object, a property may be selected from among the properties in the key set that have not yet been incorporated into the temporary key. In turn, each of the one or more properties may be selected and incorporated into the respective key for the selected object.

As will be described, the search system 100 may hash the selected property's value k times. To this end, the search system 100 may maintain an inner loop count for a loop associated with the selected property. At block 235, the search system 100 may set the loop count. For example, and not by way of limitation, a variable i used as the loop count may begin with a value of 1 and may be incremented after each time the value of the selected property is hashed. Thus, at the first time the loop count is set, the loop count may be set to a value of 1. Each subsequent time, for the same selected property, setting the loop count may mean incrementing the loop count.

At block 240, the search system 100 may hash the selected property's value associated with the selected object. Specifically, in some embodiments, a hash function may be applied to that value of the selected property, using a seed based on the current loop count and the property identifier. For instance, given the above variable i, the hash function may be applied to the value of the selected property using a seed of i plus the property identifier.

At block 245, the temporary key of the object may be updated to be the result of the hash performed at block 240 combined with the current value of the temporary key. For example, and not by way of limitation, a logical OR may be performed of the hash and the temporary key, and the result may be stored back into the temporary key.

At decision block 250, the search system 100 may determine whether the value of the selected property has been hashed k times already. If not, then the method 200 may return to block 235. However, if hashing of the selected property's value in the selected object has been performed k times, the method 200 may continue to block 255.

In some embodiments, as a result of each property having a unique identifier, the various seeds used for the hash functions applied to the property values are offset by the differences between the numerical property identifiers. For instance, suppose a first property has an identifier of 1 and a second property has an identifier of 2. In that case, the initial seed used for the first hash for the first property may be 2, while the initial seed used for the first hash for the second property may be 3. In some embodiments, the difference between these initial seeds is 1 because the difference between the identifiers of the first and second properties is 1.

As a result of these distinct initial seeds, each property value may determine a k-bit pattern within the key eventually resulting for the selected object. The key may be an m-bit vector, and the k-bit pattern within this vector corresponding to a first property may have both its position and value determined by the first property. More specifically, the position of the k-bit pattern corresponding to the first property may be based on the identifier of the first property, and the value may be based on the value of that first property in the selected object. The various k-bit patterns representing the various properties of the key set may overlap within the m total bits of the key. Among other aspects, the use of these varying initial seeds may distinguish the keys described in this disclosure from conventional keys, and may enable partial key searching with Bloom filters.

At decision block 255, it may be determined whether any additional properties of the key set remain to be incorporated into the temporary key for the selected object. If so, then the method 200 may return to block 230, where an additional property may be selected from among those in the key set not yet having been selected for the selected object. Otherwise, given that none of the properties in the key set remain to be considered for the selected object, at block 260, the search system 100 may set the key for the selected object to the current value of the temporary key, which incorporates each of the properties in the key set. Thus, the key may be atomic in the sense that it may be a single, unsegmented key, yet the key may incorporate multiple properties.

At decision block 265, it may be determined whether any additional objects 150 remain for which keys still need to be generated. If so, then the method 200 may return to block 220, where an additional object may be selected from among those not yet having been selected. Otherwise, given that no other objects 150 remain, the method may end at block 270.

With the various keys for each object having been determined, a user may perform Bloom filter searches to identify objects 150 having certain values in the key set of properties. The user may search across only a single one the of the properties in the key set, or may search across multiple properties in the key set, and in each case the Bloom filter search may be applied to the various keys of the objects 150.

Figure 3:
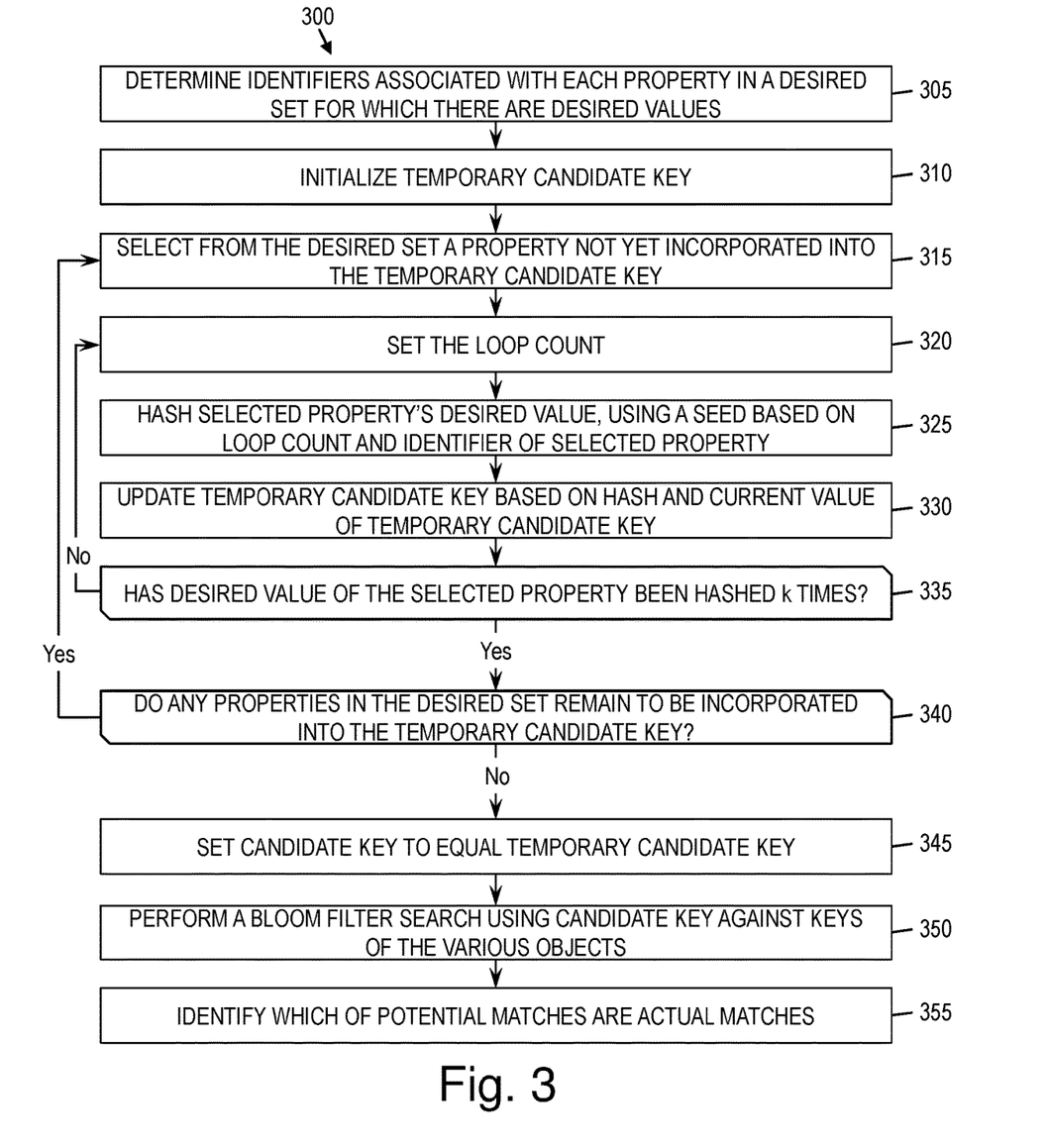
FIG. 3 is a flow diagram of a method for searching the objects based on desired values of properties, according to some embodiments of this disclosure.

FIG. 3 is a flow diagram of a method 300 for searching objects 150, according to some embodiments of this disclosure. The searching may be performed to identify objects that have desired values for a desired set of properties, where the desired set of a properties is a proper or improper subset of the key set of properties. In some embodiments, the desired set may be a proper subset of the key set, and the search system 100 need not have keys stored that represent only the desired set with no other properties included. In other words, it may be the case that the search system 100 may be required to search based on partial keys.

At block 305, the search system 100 may determine the identifiers associated with each property in the desired set. In some embodiments, the identifiers may be stored in a table, each associated in the table with its respective property. Thus, determining the identifiers associated with the properties in the desired set may include looking up those properties in the table. However, it will be understood that other mechanisms exist for determining the identifiers.

At block 310, a temporary candidate key may be assigned an initial value, such as a value of 0.

The search system 100 may iterate over the one or more properties in the desired set. To this end, at block 315, a property not yet incorporated into the temporary candidate key may be selected from among the desired set of properties. In turn, each of the properties in the desired set may be selected and incorporated into a candidate key with which a Bloom filter search will be performed.

Analogously to the above method 200, the desired value of the selected property may be hashed k times. To this end, at block 320, the search system 100 may set a loop count. Initially, at the first time the loop count is set, the loop count may be set to a value of 1. Each subsequent time, for the same selected property, setting the loop count may mean incrementing the loop count.

At block 325, the search system 100 may hash the selected property's desired value. Specifically, in some embodiments, a hash function may be applied to the desired value of the selected property, using a seed based on the current loop count and the property identifier. Specifically, for instance, given the above variable i, the hash function may be applied to the desired value of the selected property using a seed of i plus the property identifier.

At block 330, the temporary candidate key may be updated to be the result of the hash performed at block 325 combined with the current value of the temporary candidate key. For example, and not by way of limitation, a logical OR may be performed of the hash and the temporary candidate key, and the result may be stored back into the temporary candidate key.

At decision block 335, the search system 100 may determine whether the desired value of the selected property has been hashed k times already. If not, then the method 200 may return to block 320. However, if hashing of the selected property's desired value has been performed k times, the method 300 may continue to block 340.

At decision block 340, it may be determined whether any additional properties of the desired set remain to be incorporated into the temporary candidate key. If so, then the method 200 may return to block 315, where an additional property may be selected from among those in the desired set not yet having been selected. Otherwise, given that none of the properties in the desired set remain to be incorporated into the temporary candidate key, at block 345, the search system 100 may set the candidate key to the current value of the temporary candidate key.

As mentioned above, the desired set of properties may be smaller than the key set. In this case, the candidate key need not be an exact match with any of the keys of the various objects, which may be based on values in the entire key set of properties. Further, in this case, the candidate key may be a partial key, incorporating only a subset of properties that are incorporated into the keys of the various objects.

At block 350, the search system 100 may perform a Bloom filter search using the candidate key against the keys of the various objects 150 that were generated in the previous method 200. As is conventionally the case with Bloom filter searches, the results of a search represent potential matches. Thus, in this case, the results of the Bloom filter search may be potential matches including all objects 150 that have the desired values for the desired set of properties, as well as zero or more additional objects 150 that do not actually match the desired values for the desired set of properties.

At block 355, the search system 100 may identify which of the potential matches are objects 150 that actually have the desired values for the desired set of properties. For instance, this may be performed by comparing the values of the desired set of properties in the potential matches to the desired values for those properties, to determine which of these objects 150 are matches. The matches may be returned as a result of the search.

It will be understood that the search system 100 may be used in various applications. For example, and not by way of limitation, the search system 100 may be used in a de-duplication system, such as one used to remove duplicates from a network map.

Figure 4:
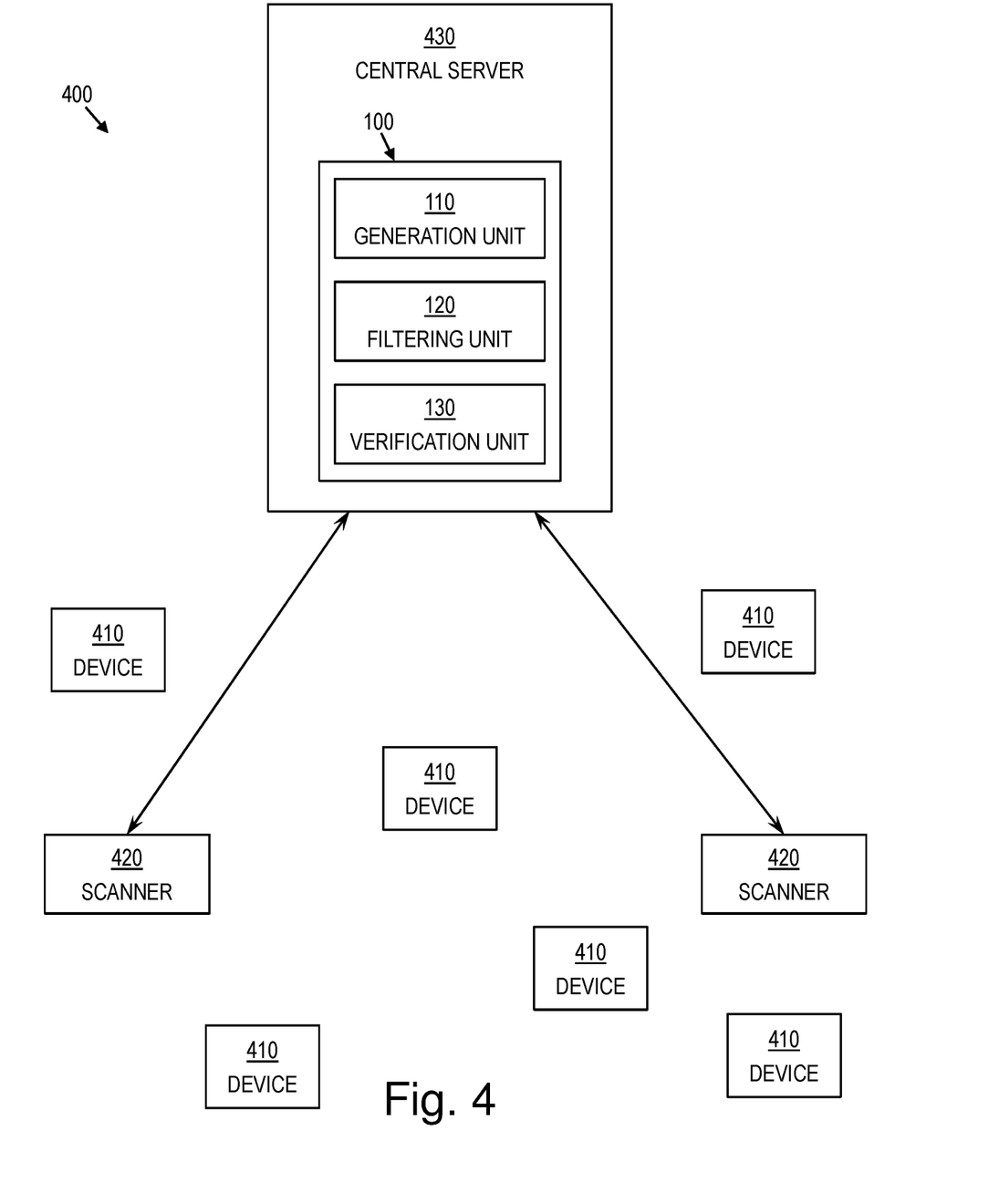
FIG. 4 is a block diagram of a de-duplication system utilizing the search system, according to some embodiments of this disclosure.

Such a de-duplication system 400, according to some embodiments, is illustrated in FIG. 4. As shown, the de-duplication system 400 may use an embodiment of the search system 100, where the various objects 150 are devices 410. The devices 410 may be, for example, computing devices, or other components connected to computing devices to enable networking. The de-duplication system 400 may keep track of which of the devices 410 are online and networked.

The de-duplication system may have two or more scanners 420, which may be positioned at remote locations from one another, to enable a wider range of detection. Each scanner 420 may detect a set of devices 410 that are within its respective range, and may communicate to a central server 430 information about the devices 410 found. In some cases, multiple scanners 420 may each detect a particular device 410, and in those cases, each such scanner 420 may transmit information about that device 410 to the central server 430. The central server 430 may use the search system 100 to identify duplicates in such cases.

In some embodiments, each device 410 may have values established for a plurality of properties, where the properties may represent information about the device 410. For further example, a first property may represent a device type, a second property may represent a time the device 410 joined the network, and a third property may represent a device name. The de-duplication 400 may have established which of these properties together will act as a key set, and the first time a device 410 is identified by the central server 430, the de-duplication system 400 may generate a key for that device 410 based on the values of the properties in the key set. This generation may be performed by way of the method 200 described above for generating keys for objects 150.

When information about a device 410 is received at the central server 430 from a scanner 420, that information may or may not be complete with respect to all the properties incorporated into the key set. The de-duplication system 400 may generate a candidate key using the information received about the device 410. Specifically, the candidate key may incorporate desired values that are the known values of the device 410 within the key set of properties. With that candidate key, the de-duplication system 100 may perform a Bloom filter search across the other devices 410 identified on the network. If an actual match is found, after verifying the potential matches, the de-duplication system 100 may consider the device 410 to be the same as the match already known to be networked. The de-duplication system 100 may therefore handle the newly received information about the device 410 as duplicative, such as by merging that information with the information about the identified match, or by replacing the old information with the newly received information about the device 410.

Figure 5:
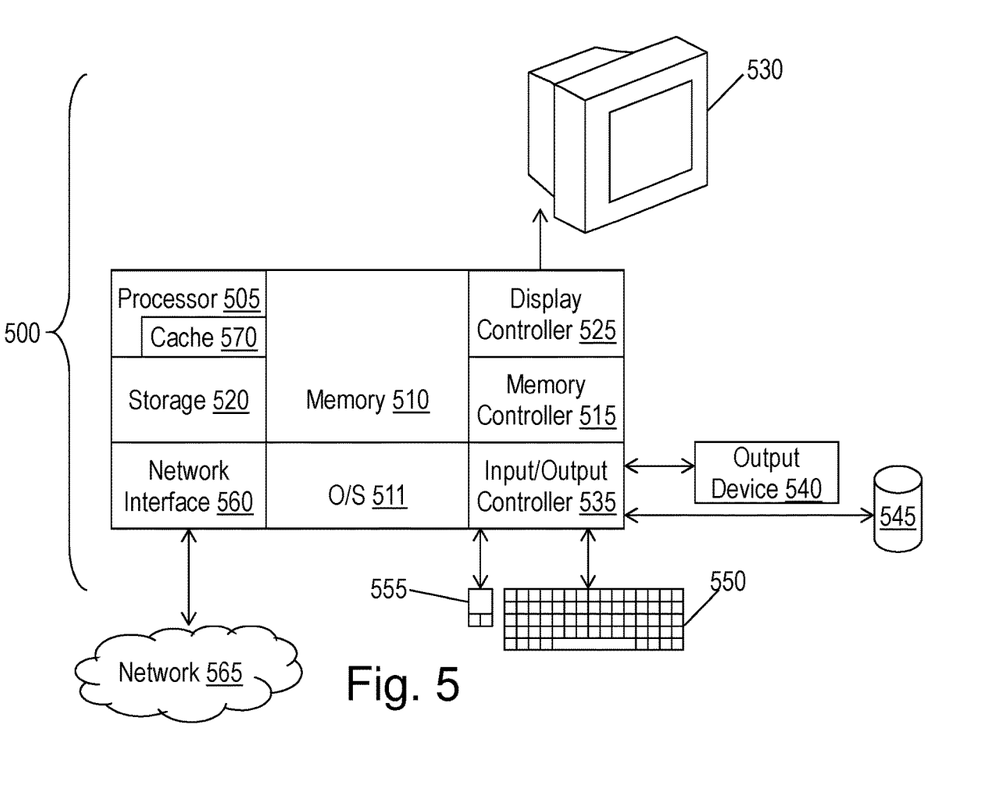
FIG. 5 is a block diagram of a computer system for implementing some or all aspects of the search system, according to some embodiments of this disclosure.

FIG. 5 illustrates a block diagram of a computer system 500 for use in implementing a search system 100 or method according to some embodiments. The search systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the search systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Search systems 100 and methods according to this disclosure may be embodied, in whole or in part, in computer program products or in computer systems 500, such as that illustrated in FIG. 5.

Technical effects and benefits of some embodiments include the ability to consider multiple properties when performing a Bloom filter search, while not limiting the Bloom filter search to the entire set of such properties. The result may be a more robust searching mechanism than exists conventionally, where a user may pick and choose which properties to search at a given time, despite using atomic keys that incorporate a wider set of properties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining a key set of properties, the key set of properties being a subset of a plurality of available properties;
    generating a plurality of keys for a plurality of objects based on the key set of properties and assigning a unique numerical identifier to each property in the key set of properties, the plurality of keys comprising a respective key for each object based on a value associated with the object for each property in the key set of properties;
    receiving a request to search for one or more matching objects having a set of desired values for a desired set of properties, the desired set of properties being a subset of the key set of properties and excluding one or more properties in the key set of properties;
    performing, by a computer processor, a Bloom filter search on the plurality of objects, the Bloom filter search based on the set of desired values for the desired set of properties and further based on the plurality of keys for the plurality of objects that are based on the key set of properties; and
    identifying the one or more matching objects based on the Bloom filter search,
    wherein the key set of properties comprises a first property and a second property, wherein generating the plurality of keys comprises generating a first key for a first object of the plurality of objects, and wherein generating the first key comprises:
    hashing a predetermined number of times a value of the first property associated with the first object, wherein an initial seed used for the hashing of the value of the first property is based on the unique numerical identifier assigned to the first property; and
    hashing the predetermined number of times a value of the second property associated with the first object, wherein an initial seed used for the hashing of the value of the second property is based on the unique numerical identifier assigned to the second property;
    wherein the first key is based on the hashing the first value of the first property and the hashing the value of the second property.

2. The computer-implemented method of claim 1, wherein the first key for the first object comprises a k-bit pattern representing each property in the key set of properties, and wherein k is the predetermined number.

3. The computer-implemented method of claim 2, wherein a position and value of the k-bit pattern representing the first property in the first key are based on the numerical identifier of the first property and the value of the first property associated with the first object.

4. The computer-implemented method of claim 1, wherein the performing the Bloom filter search comprises:
    generating a candidate key based on the set of desired values for the desired set of properties; and
    performing the Bloom filter search to identify the candidate key among the plurality of keys for the plurality of objects.

5. The computer-implemented method of claim 4, wherein the candidate key is a partial key as compared to the plurality of keys.

6. A system comprising:
    a memory having computer readable instructions; and one or more processors for executing the computer readable instructions, the computer readable instructions comprising:
  determining a key set of properties, the key set of properties being a subset of a plurality of available properties;
  generating a plurality of keys for a plurality of objects based on the key set of properties and assigning a unique numerical identifier to each property in the key set of properties, the plurality of keys comprising a respective key for each object based on a value associated with the object for each property in the key set of properties;
  receiving a request to search for one or more matching objects having a set of desired values for a desired set of properties, the desired set of properties being a subset of the key set of properties and excluding one or more properties in the key set of properties;
  performing a Bloom filter search on the plurality of objects, the Bloom filter search based on the set of desired values for the desired set of properties and further based on the plurality of keys for the plurality of objects that are based on the key set of properties; and
  identifying the one or more matching objects based on the Bloom filter search,
  wherein the key set of properties comprises a first property and a second property, wherein generating the plurality of keys comprises generating a first key for a first object of the plurality of objects, and wherein generating the first key comprises:
  hashing a predetermined number of times a value of the first property associated with the first object, wherein an initial seed used for the hashing of the value of the first property is based on the unique numerical identifier assigned to the first property; and
  hashing the predetermined number of times a value of the second property associated with the first object, wherein an initial seed used for the hashing of the value of the second property is based on the unique numerical identifier assigned to the second property;
  wherein the first key is based on the hashing the first value of the first property and the hashing the value of the second property.

7. The system of claim 6, wherein the first key for the first object comprises a k-bit pattern representing each property in the key set of properties, and wherein k is the predetermined number.

8. The system of claim 7, wherein a position and value of the k-bit pattern representing the first property in the first key are based on the numerical identifier of the first property and the value of the first property associated with the first object.

9. The system of claim 6, wherein the performing the Bloom filter search comprises:
  generating a candidate key based on the set of desired values for the desired set of properties; and
  performing the Bloom filter search to identify the candidate key among the plurality of keys for the plurality of objects.

10. The system of claim 9, wherein the candidate key is a partial key as compared to the plurality of keys.

11. A computer program product for searching among objects, the computer program product comprising a computer readable storage medium having program instructions embodied therewith, the program instructions executable by a processor to cause the processor to perform a method comprising:
  determining a key set of properties, the key set of properties being a subset of a plurality of available properties;
  generating a plurality of keys for a plurality of objects based on the key set of properties and assigning a unique numerical identifier to each property in the key set of properties, the plurality of keys comprising a respective key for each object based on a value associated with the object for each property in the key set of properties;
  receiving a request to search for one or more matching objects having a set of desired values for a desired set of properties, the desired set of properties being a subset of the key set of properties and excluding one or more properties in the key set of properties;
  performing a Bloom filter search on the plurality of objects, the Bloom filter search based on the set of desired values for the desired set of properties and further based on the plurality of keys for the plurality of objects that are based on the key set of properties; and
  identifying the one or more matching objects based on the Bloom filter search,
  wherein the key set of properties comprises a first property and a second property, wherein generating the plurality of keys comprises generating a first key for a first object of the plurality of objects, and wherein generating the first key comprises:
  hashing a predetermined number of times a value of the first property associated with the first object, wherein an initial seed used for the hashing of the value of the first property is based on the unique numerical identifier assigned to the first property; and
  hashing the predetermined number of times a value of the second property associated with the first object, wherein an initial seed used for the hashing of the value of the second property is based on the unique numerical identifier assigned to the second property;
  wherein the first key is based on the hashing the first value of the first property and the hashing the value of the second property.

12. The computer program product of claim 11, wherein the first key for the first object comprises a k-bit pattern representing each property in the key set of properties, and wherein k is the predetermined number.

13. The computer program product of claim 12, wherein a position and value of the k-bit pattern representing the first property in the first key are based on the numerical identifier of the first property and the value of the first property associated with the first object.

14. The computer program product of claim 11, wherein the performing the Bloom filter search comprises:
  generating a candidate key based on the set of desired values for the desired set of properties; and
  performing the Bloom filter search to identify the candidate key among the plurality of keys for the plurality of objects.

* * * * *